United States Patent [19]
Driear

[11] Patent Number: 4,955,955
[45] Date of Patent: Sep. 11, 1990

[54] PORTABLE CONVEYOR ASSEMBLY

[75] Inventor: Joseph R. Driear, Thiensville, Wis.

[73] Assignee: Robert D. Sawyer, Oak Creek, Wis.

[21] Appl. No.: 361,495

[22] Filed: Jun. 5, 1989

[51] Int. Cl.⁵ .......................................... B65G 41/00
[52] U.S. Cl. .................................. 198/318; 198/861.5
[58] Field of Search ................ 198/318, 860.1, 861.1, 198/861.5

[56] References Cited

U.S. PATENT DOCUMENTS

| 1,530,564 | 3/1925 | Lemmon | 198/318 X |
| 2,519,478 | 8/1950 | King | 198/318 X |
| 4,526,265 | 7/1985 | Enns | 198/318 |

FOREIGN PATENT DOCUMENTS

| 202445 | 9/1955 | Australia | 198/318 |
| 210995 | 6/1957 | Australia | 198/318 |
| 550466 | 9/1956 | Belgium | 198/318 |
| 688128 | 1/1940 | Fed. Rep. of Germany | 198/318 |
| 235683 | 12/1944 | Switzerland | 198/318 |
| 570034 | 7/1944 | United Kingdom | 198/318 |

Primary Examiner—Joseph E. Valenza
Assistant Examiner—D. Glenn Dayoan
Attorney, Agent, or Firm—Andrus, Sceales, Starke & Sawall

[57] ABSTRACT

A portable conveyor assembly comprising an inclined conveyor having a lower end and an upper end. A pair of rear wheels support the lower end of the conveyor and a pair of caster wheels are spaced forwardly from the rear wheels and are suspended from a horizontal axle through vertical pivot shaft so that the caster wheels can freely rotate about the pivot shafts. An adjustable linkage interconnects between the axle and the conveyor, and a lead screw mechanism is operably connected to the linkage and acts to vary the angularity of the linkage and thus change the angle of inclination of the conveyor. A mechanism is associated with the linkage to prevent rotation of the axle and maintain the caster wheel pivot axes in a vertical attitude as the angle of inclination of the conveyor is changed.

13 Claims, 3 Drawing Sheets

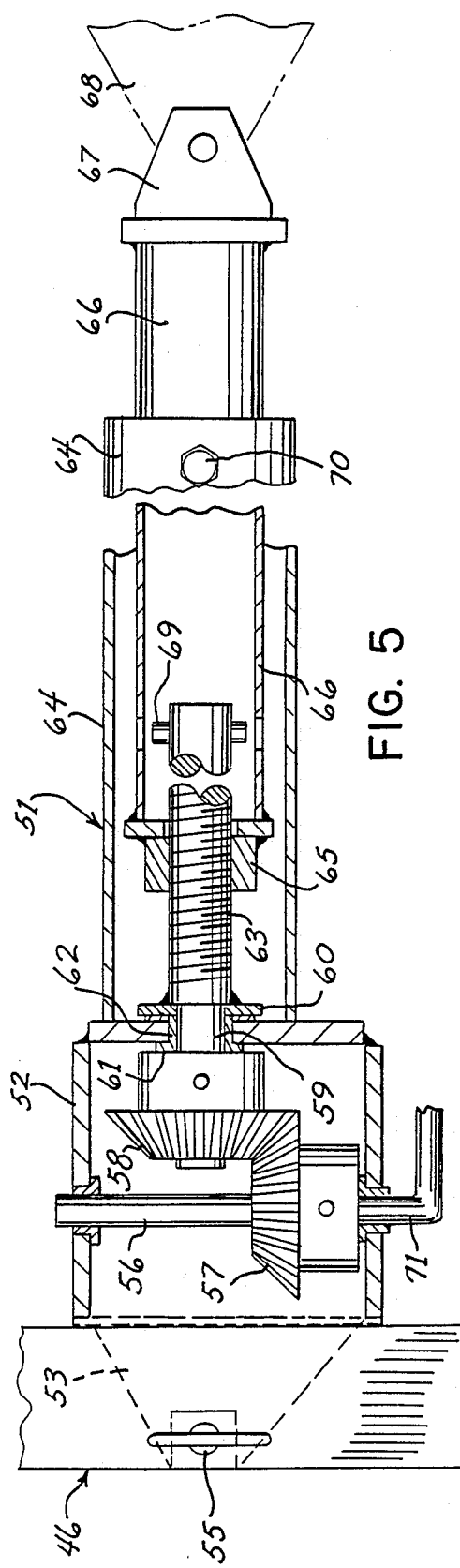
FIG. 5
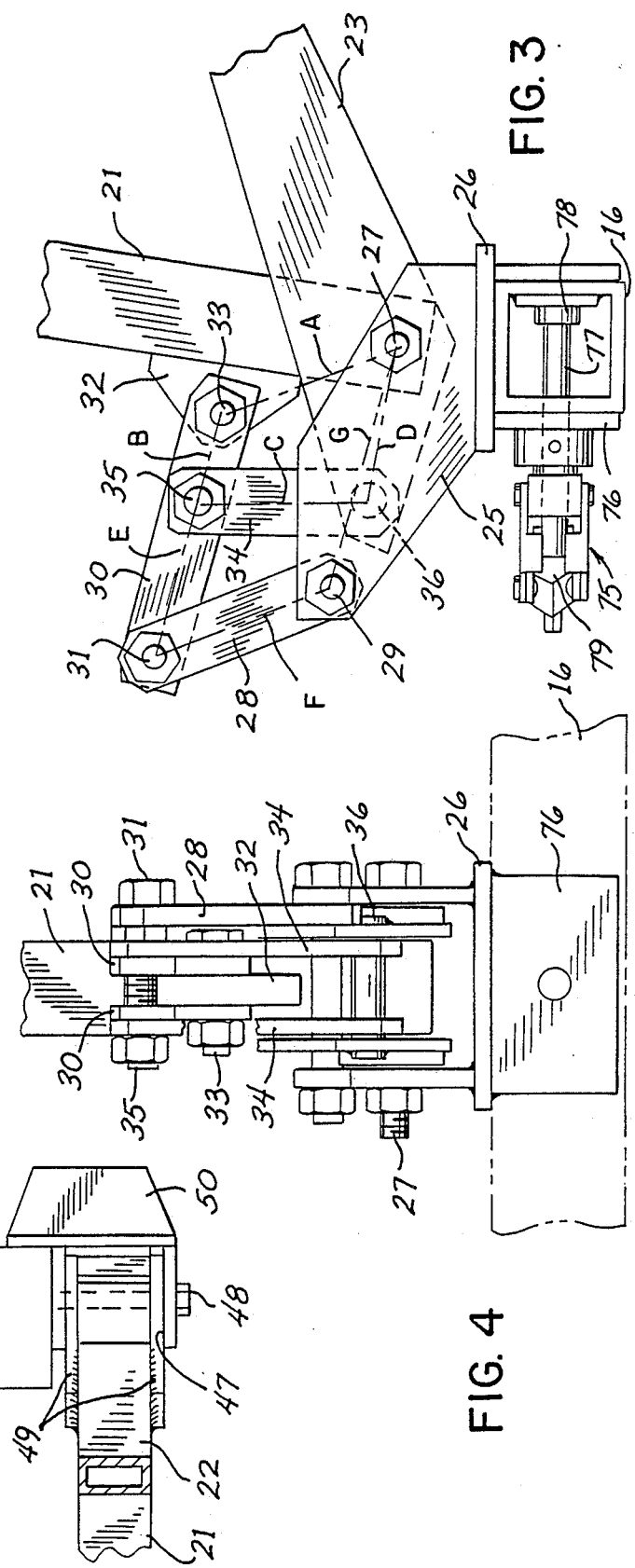
FIG. 3
FIG. 4

PORTABLE CONVEYOR ASSEMBLY

BACKGROUND OF THE INVENTION

Portable conveyor units are used for conveying bulk materials such as sand, gravel, concrete and the like. The typical portable conveyor unit includes an endless belt conveyor that is positioned at an inclined angle. The bulk material is fed to the lower end of the inclined conveyor and is discharged from the upper end through a hopper to a location of use.

To enable the conveyor unit to be readily moved between different locations on a given site, the conveyor is mounted on wheels. In the typical installation, a pair of rear wheels are located at the lower end of the conveyor, while a pair of caster wheels are supported from a horizontal axis through vertical pivot shafts and are located beneath the central portion of the conveyor.

To vary the angle of inclination of the conveyor, a pair of rear arms connect the axle to the rear or lower end of the conveyor while a pair of forward arms connect the axle to the forward or upper end of the conveyor. A cable mechanism is employed to pivot the forward arms relative to the rear arms to thereby change the angle of inclination of the conveyor.

With the portable conveyor unit as used in the past a change in inclination of the conveyor causes the caster wheel axle to rotate so that the pivot axes for the caster wheels are moved to a non-vertical position. The non-vertical attitude of the caster wheel pivot axes provides added stress on the axle and caster wheels supports and also makes the conveyor unit more difficult to move over the terrain.

Because of this, it has been the practice in the past to incorporate an axle leveling assembly with the conveyor unit. As the angularity of the conveyor is changed, the leveling assembly is manually operated to maintain the pivot axes of the caster wheels in a vertical attitude. In normal operation, two or three adjustments of the axle leveling assembly may be necessary as the conveyor is raised in order to maintain the pivot axes in a vertical position.

The incorporation of the axle-leveling assembly not only increases the overall cost of the conveyor, but the required adjustments of the assembly also increases the time required for elevating and lowering the conveyor.

SUMMARY OF THE INVENTION

The invention is directed to a portable conveyor assembly incorporating a mechanism which will automatically maintain the pivot axes of the caster wheels in a vertical attitude as the angularity of the conveyor is changed.

The conveyor assembly includes an inclined conveyor having a lower end and an upper end, and a pair of rear wheels support the lower end of the conveyor. In addition, a pair of caster wheels are spaced forwardly from the rear wheels and are disposed beneath the central portion of the conveyor. Each caster wheel is mounted for rotation on a U-shaped or bifurcated bracket and each bracket in turn in mounted for universal movement on a horizontal axle about a vertical pivot axis.

An adjustable linkage interconnects the axle and the conveyor. The linkage includes a pair of tie-bars that interconnect the caster wheel axle and the lower end portion of the conveyor. In addition, the linkage includes a pair of upper struts and a pair of lower struts. The lower ends of the lower struts are connected to the axle, while the upper ends of the upper struts are pivotally connected to the conveyor. The adjacent ends of the struts are interconnected by a drive mechanism which may take the form of a lead screw. By operating the lead screw, the angularity between the struts is changed to thereby vary the inclination of the conveyor.

In addition, a separate second linkage interconnects the lower ends of the tie-bars, the lower ends of the lower struts and the caster wheel axle. The second linkage is constructed and arranged so that the pivotal movement of the lower struts will act to prevent rotation of the horizontal axle and thus will maintain the vertical pivot axes for the caster wheels in a vertical attitude at all times.

The conveyor unit of the invention is self-leveling and automatically maintains the pivot axes for the caster wheels in a vertical position, thus eliminating the manual axle-leveling adjustment that has been required in prior conveyor units.

By maintaining the caster wheel pivot axes in a vertical position, stress on the bearings and caster wheel supports is reduced, thereby enabling these components to be formed of lesser weight materials.

Because of the design of the linkage which connects the axle and the conveyor, a greater elevation can be achieved for a given length of conveyor than with conveyor as used in the past.

The use of a lead screw as the drive mechanism has substantial advantages over a cable, as used in the past, for the lead screw mechanism is a positive self-locking drive which prevents accidental free-fall of the conveyor.

Other objects and advantages will appear in the course of the following description.

DESCRIPTION OF THE DRAWINGS

The drawings illustrate the best mode presently contemplated of carrying out the invention.

In the drawings:

FIG. 3 is an enlarged fragmentary side elevation showing the connection of the lower struts to the caster-wheel axle;

FIG. 4 is an end view of the structure shown in FIG. 3;

FIG. 5 is a horizontal section showing the lead screw mechanism;

DESCRIPTION OF THE ILLUSTRATED EMBODIMENT

Figures 1, 2:
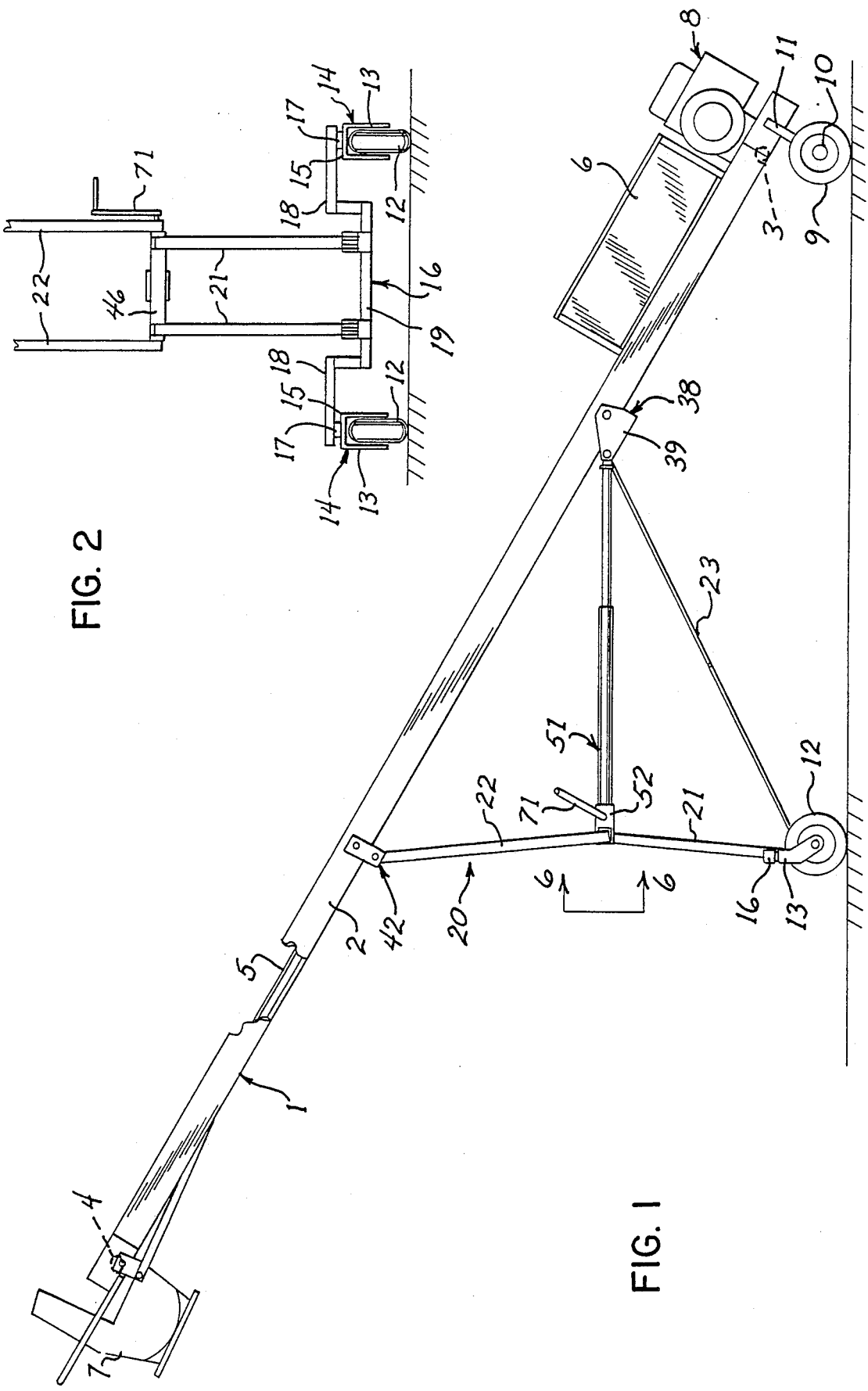
FIG. 1 is a side elevation of the conveyor of the invention.
FIG. 2 is a fragmentary end view of the conveyor.

The drawings illustrate a portable conveyor unit which has particular use in conveying bulk materials, such as concrete, sand, gravel and the like.

The conveyor includes a frame 1 including a pair of side plates 2 and a drive roll 3 and idler roll 4 are journaled for rotation between side plates 2.

In use, the conveyor is at an inclined angle and the drive roll 3 is located at the lower end of the frame while the idler roll 4 is at the upper end of the frame. An endless conveying belt 5 is trained over the rollers 3 and 4.

The material to be conveyed is fed onto the lower end of belt 5 via a feed hopper 6 which is located at the lower end of frame 1 and the material is discharged from the belt through a discharge hopper 7 that is mounted on the upper end of frame 1.

A drive mechanism, indicated generally by 8, is secured to the lower end of the frame and may take the form of a gasoline engine, whose drive shaft is operable connected to the drive roller 3 through a suitable transmission. The drive for the conveyor belt 5 is conventional and in itself forms no part of the present invention.

A pair of rear wheels 9 are located at the lower end of frame 1 and are journaled on the ends of an axle 10 that is supported from frame 1 through a pair of axle supports 11.

In addition to wheels 9, the conveyor also includes a pair of caster wheels 12 which are located forwardly of the rear wheels 9 and are positioned beneath the central portion of the conveyor frame 1. Each caster wheel 12 is journaled for rotation on a pair of arms 13 of a U-shaped bracket or clevis 14. As best shown in FIG. 2 the upper surface 15 of bracket of 14 is suspended from a horizontal axle 16 by a vertical pivot shaft 17. With this construction caster wheels 12 can rotate about their axes as well as rotating 360° around the axes of the vertical pivot shafts 17.

As best shown in FIG. 2, axle 16 is provided with a pair of end sections 18 and a central section 19 which is located at a lower elevation than end sections 18.

Connecting axle 16 with conveyor frame 1 is a linkage indicated generally by 20. Linkage 20 is composed of a pair of lower struts 21, the lower ends of which are pivotally connected to axle 16, a pair of upper struts 22, the upper ends of which are pivotally connected to conveyor frame 1, and a pair of tie-bars 23 which are interconnected between axle 16 and conveyor frame 1.

As shown in FIGS. 3 and 4, each tie-bar 23 and corresponding lower strut 21 are pivotally connected to a pair of arms 25 that project upwardly from a generally U-shaped bracket 26 which is secured to the axle 16. The pivotal connection is provided by shaft 27.

The lower ends of a pair of links 28 are connected to the forward end of arm 25 by pivot shaft 29, while the upper ends of the links 28 are pivotally connected to arm 30 through a shaft 31. As seen in FIG. 3 the opposite end of arm 30 is pivoted to a lug 32 that projects forwardly from the lower end of strut 21 by a pivot shaft 33.

An additional pair of links 34 interconnect the arm 30 with the lower end of the tie-bar 23. In this regard, the upper end of each link 34 is pivoted to arm 30 via shaft 35, while the lower ends of links 34 are connected to the tie arm 33 through the pivot shaft 36.

This linkage between the lower end of each strut 21 and the tie bar 23 enables the pivot shafts 17 of the caster wheels to remain in a vertical attitude as the linkage 20 is pivoted, as will be hereinafter described.

Figure 7:
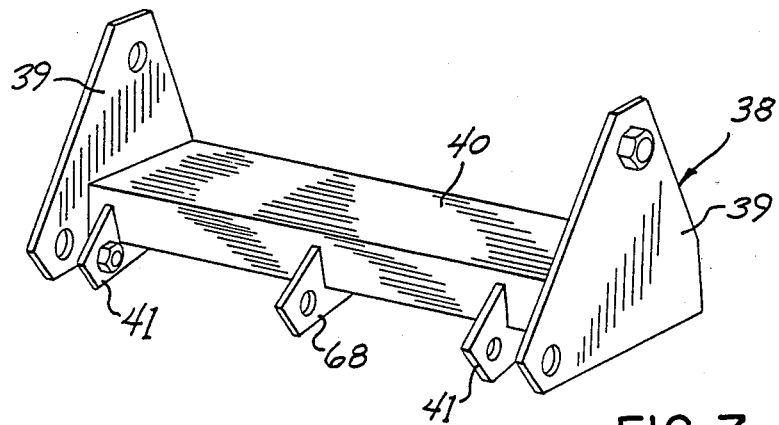
FIG. 7 is a perspective view of the attaching bracket for attaching the tie-bars to the conveyor frame.

The rear end of each tie bar 23 is pivotally connected through bracket 38 to the lower end of conveyor frame 1. The bracket 38 is provided with a pair of side plates 39 which are connected to the respective side plates 2 of conveyor frame 1 and a cross bar 40 connects the side plates 39. The ends of the tie bars 23 are pivotally connected to lugs 41 that project outwardly from cross bar 40 as best shown in FIG. 7.

Figure 8:
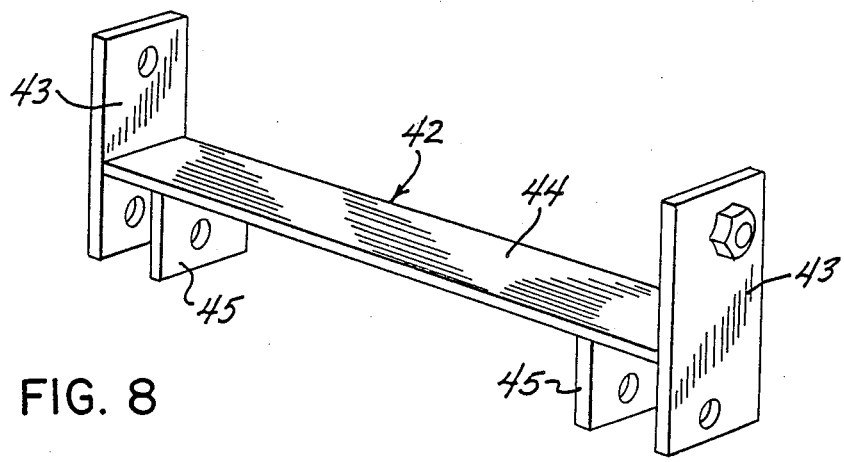
FIG. 8 is a perspective view showing the attaching bracket for attaching the upper strut to the conveyor frame.

The upper struts 22 are pivotally connected to the upper end portion of conveyor frame 1 through a bracket 42, as seen in FIG. 8. Bracket 42 includes a pair of side plates 43 which are secured to the respective side plates 2 of frame 1 and a cross bar 44 interconnects side plates 43. The upper ends of struts 22 are pivotally connected to lugs 45 which extend downwardly from cross bar 44.

Figure 6:
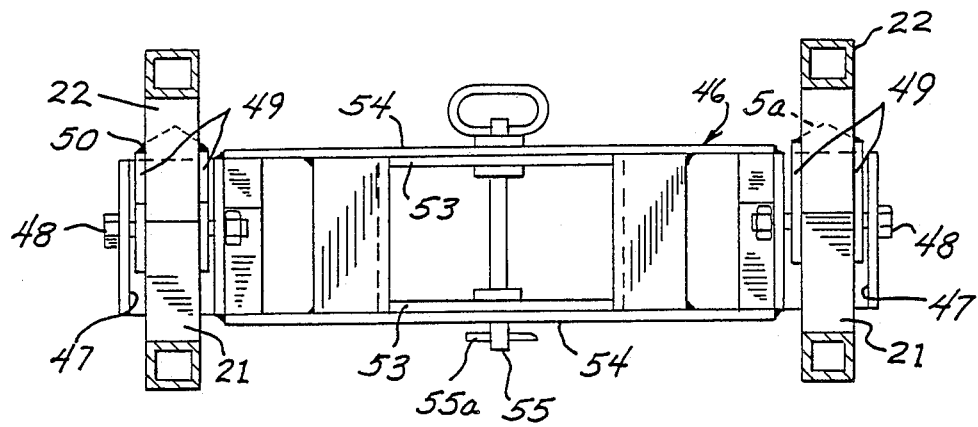
FIG. 6 is a view taken along lines 6—6 of FIG. 1 and showing the attachment of the struts to the drive mechanism.

The adjacent ends of upper struts 22 and lower struts 21 are connected together through a thrust bar 46 which is best illustrated in FIG. 6. The ends of thrust bar 46 are provided with pockets 47 and the adjacent ends of struts 21 and 22 are located within pockets 47 and are pivoted to thrust bar 46 by pivot shafts 48. In this regard, lugs 49 are secured in parallel relation to the lower end of each strut 22 and straddle the upper end of strut 21, and pivot shaft 48 extends through aligned holes in bar 46 to provide the pivotal connection. A block or plug may be secured within the lower end of strut 22 to provide reinforcement for the strut at the location of the pivotal connection. A lug 50 is welded to the rear surface of thrust bar 46 in alignment with each pocket 47 and serves to strengthen the pocket. Lugs 50 are located above the horizontal center line of bar 46 to allow the screw mechanism crank rod to pass on either side.

The angularity between struts 21 and 22 is varied to correspondingly change the inclination of conveyor frame 1 by a lead screw mechanism 51 which is best illustrated in FIG. 5. The lead screw mechanism 51 includes a generally rectangular gear housing 52 having a pair of parallel ears 53 which extend outwardly from the gear housing and the ears are connected to the upper and lower surfaces 54 of thrust bar 46 by a vertical detachable pin 55. As shown in FIG. 6, the ears 53 extend in a central opening in thrust bar 46, and the pin 55 extends through aligned holes in ears 53 and surfaces 54 of bar 46. The pin is retained in the aligned hole by insertion of a locking key 55a through a transverse opening in pin 55, as seen in FIG. 6.

As best shown in FIG. 5, a drive shaft 56 is journaled within opposite sides of housing 52 and shaft 56 carries a bevel gear 57 which is engaged with a second bevel gear 58 mounted on shaft 59. Shaft 59 extends through the wall of housing 52 and carries an annular collar 60. A thrust bearing 61 is interposed between collar 60 and housing 52, while a radial bearing 62 journals the shaft 59 for rotation in the housing wall and also serves as a thrust bearing between gear 58 and housing 52.

The outer portion of shaft 59 is threaded and constitutes a screw 63 which is spaced within an outer tubular housing 64. Screw 63 is threadedly engaged with nut 65 which is carried by sleeve 66 that is located inwardly of tubular housing 64 and projects outwardly beyond the housing. The outer projecting end of sleeve 66 carries a lug 67 which is pivoted to lug 68 on cross bar 40 of bracket 38.

As shown in FIG. 5, a stop pin 69 is secured on the end of the screw 63 and prevents complete displacement of the screw from nut 65.

Referring to FIG. 5, three adjustable screws 70 are threaded in holes in the outer surface of housing 64.

Screws 70 are spaced circumferentially of housing 54 and are located adjacent the end of the housing. The screws are adjusted so that the inner ends of the screws are in proximate relation to sleeve 66 and permit the sleeve to move axially without undue resistance or friction. When screw 63 and sleeve 66 are extended from housing 64, the screws 70 provide additional support to prevent buckling of the column formed by screw 63 and sleeve 66 in the event of an accidental compressive overload.

To operate the lead screw, a crank 71 is secured to the outer projecting end 72 of shaft 56. By rotating crank 71, screw 63 will be rotated, thereby moving nut 65 axially of the screw and correspondingly moving sleeve 66 axially relative to the tubular housing 64. This action will pivot the conveyor frame 1 in a vertical plane to change the inclination of the conveyor. For example, by rotating crank 71 in one direction sleeve 66 is extended relative to housing 64 to thereby pivot conveyor frame 1 upwardly. It is important that the axis of connecting pin 55 be located forwardly, in a direction away from screw 63, with respect to the pivotal connections of struts 21 and 22 to thrust bar 46, as shown by the dimension A in FIG. 5. This relationship prevents the tendency of the thrust bar to rotate about the pivotal connections of the struts to the thrust bar when high forces are applied by the screw mechanism.

The change in angularity between tie bars 23 and lower struts 21 as the conveyor is pivoted upwardly would normally tend to rotate the axle 16 and thereby tilt the pivot shafts 17 of caster wheels 12 to a non-vertical condition. However, the linkage provided by arms 25, 28, 30 and 34 which interconnects the lower ends of the strut 21 and tie bar 23, compensates for this tilting movement of the axle, thereby maintaining the pivot shaft 17 in a vertical attitude as the conveyor is raised and lowered. In this regard, the composite linkage is a novel arrangement which incorporates a four-bar linkage with a parallelogram linkage to maintain the pivot axis 17 in a vertical position as the conveyor is elevated and lowered; or in other words, maintains the axle plate 26, as shown in FIG. 3, in a horizontal attitude at all times. More specifically, pivot 27 is fixed in position and the four-bar linkage includes the link extending between pivots 27 and 33 and indicated by A in FIG. 3, the link extending between pivots 33 and 35 indicated by B, the link extending between pivots 35 and 36 labeled C and the link extending between pivots 36 and 27 labeled D. The four links A-D are constructed and arranged such that the angle of link B to the horizontal will remain constant as the struts 21 and tie bars 23 are pivoted during elevation of the conveyor. The link B also comprises a portion of a parallelogram linkage which consists of link A, the link extending between pivots 33 and 31, indicted by E, and which includes link B, the link extending between pivots 31 and 29, labeled F, and the link extending between pivots 29 and 27 and labeled G. In the parallelogram linkage, link E is parallel to link G and will remain parallel throughout pivotal movement of the parallelogram linkage. Link G is integrally connected to axle plate 26, as shown in FIG. 3. As previously noted, link B extending between pivots 33 and 35, will remain at the same angle to the horizontal at all times and as the parallel link G will remain parallel to link B, the plate 26 being secured to link G will thus remain horizontal during pivotal movement of the conveyor.

As shown in FIG. 3, U-shaped bracket 26 is normally not welded or fixed to axle 16 and therefore a clamping mechanism can be incorporated to clamp bracket 26 to the axle and prevent tilting or rotation of the bracket relative to the axle. The clamp, as seen in FIG. 3, is a standard four-bar linkage clamp 75 that is secured to the outer surface of flange 76 of bracket 26. Clamp 75 includes a plunger 77 that extends through aligned holes in flange 76 and axle 16, and the inner end of the plunger bears against a plate or pad 78 that is secured to the opposite wall of the axle. Clamp 75 is provided with a handle 79 and by pivoting the handle through an arc of about 180°, the plunger 77 can be moved between a retracted position and a clamping position where it bears against pad 78. In the clamping position clamp 75 will fix bracket 26 to axle 16 to prevent relative movement therebetween.

Thus the invention provides an automatic, self-leveling feature which maintains the pivot axes of the caster wheels in a vertical attitude at all times. This eliminates undue stress on the caster wheel bearings and caster wheel support brackets, that can occur in a conventional construction where the pivot axes of the caster wheels are tilted from the vertical attitude.

The lead screw mechanism provides an improved drive system in that it is self-locking and has distinct advantages over cable actuated conveyors as used in the past. Further, the lead screw mechanism is designed so that by rotating it 180° around its longitudinal axis and reinserting the mounting ears 53 into the thrust bar 46 (FIG. 6), the crank operating position can be changed from one side of the conveyor to the opposite side.

As a further advantage the linkage provided by struts 21 and 22 and tie bars 23 provides a greater elevation for the conveyor for a given conveyor length. As an example, a 30 foot conveyor as used in the past had a maximum elevation of approximately 14 feet 6 inches. However, with the linkage as used in the invention the 30 foot conveyor can be elevated to a maximum height of approximately 16 feet thus providing a substantial increase in elevation without a corresponding increase in conveyor length.

By disconnecting the linkage from the conveyor frame, the assembly can be broken down into four sections which can be easily handled and set up by one man. In this disassembled condition, the sections will readily fit in the bed of a pick-up truck for transporting.

Various modes of carrying out the invention are contemplated as being within the scope of the following claims particularly pointing out and distinctly claiming the subject matter which is regarded as the invention.

I claim:

1. A portable conveyor assembly, comprising an inclined conveyor having a lower end and an upper end, first wheel means to support the lower end, caster wheel means spaced from said first wheel means and disposed beneath said conveyor, said caster wheel means being mounted for rotation about a vertical axis, an adjustable first linkage connected to said conveyor, a second linkage interconnecting said first linkage and said caster wheel means, and operating means for adjusting the first linkage to thereby vary the elevation of said conveyor, said second linkage being constructed and arranged to automatically maintain said axis in a vertical attitude as said first linkage is adjusted.

2. The assembly of claim 1, wherein said caster wheel means comprises a generally horizontal axle, at least one caster wheel, support means for supporting said caster wheel for rotation about a horizontal axis, and means for mounting said support means for free rotation about said vertical axis from said axle.

3. The assembly of claim 1, wherein said first linkage includes a first toggle link pivotally connected to the conveyor and a second toggle link pivotally connected to said second linkage, adjacent ends of said toggle links being pivotally connected together at a junction, said operating means being operably connected to said junction.

4. The assembly of claim 3, wherein said operating means comprises lead screw means.

5. The assembly of claim 4, wherein said lead screw means comprises a screw operably connected to said junction, and a nut engaged with said screw and operably connected to said conveyor, whereby rotation of said screw will act to change the angularity between said toggle links.

6. A portable conveyor assembly, comprising an inclined conveyor having a lower end and an upper end, first wheel means to support the lower end of the conveyor, caster wheel means spaced from said first wheel means and disposed beneath said conveyor, said caster wheel means being mounted for free rotation about a vertical axis, a first toggle link pivotally connected to said conveyor, a second toggle link operably connected to said caster wheel means, adjacent ends of said toggle links being connected together at a junction, a tie bar of fixed length interconnecting said caster wheel means and said conveyor, operating means for adjusting the angularity between said toggle links to thereby change the inclination of said conveyor, and means interconnecting said second toggle link and caster wheel means and responsive to adjustable movement of said toggle links for automatically preventing tilting of said vertical axis.

7. The assembly of claim 6, wherein said operating means comprises lead screw means.

8. The assembly of claim 7, wherein said lead screw means comprises a screw member operably connected to said junction, and a nut member operably connected to said conveyor, whereby rotation of said screw member will change the angularity between said toggle links.

9. The assembly of claim 6, wherein said caster wheel means comprises a horizontal axle, at least one caster wheel, support means for supporting the caster wheel for rotation about a horizontal axis, and means for mounting said support means relative to said axle about said vertical axis.

10. The assembly of claim 9, wherein said means for preventing tilting comprises second linkage means interconnecting said second toggle link and said tie bar and said axle, said second linkage means being constructed and arranged to prevent tilting of said vertical axis as the angularity between said toggle links is varied.

11. The apparatus of claim 10, wherein said second linkage means comprises a four-bar linkage including a first fixed pivot connecting said second toggle link to said caster wheel means, said four-bar linkage also including a first link, said four-bar linkage being constructed and arranged to maintain said first link at a constant angle with respect to the horizontal as said toggle links are moved relative to each other, said second linkage means also including a parallelogram linkage, said first link constituting a part of a first arm of said parallelogram linkage and said caster wheel means constituting a second arm of said parallelogram linkage, said arms being parallel, said parallelogram linkage being constructed and arranged such that said caster wheel means is maintained in a given angular position relative to said first arm and said first link during relative movement of said toggle links to prevent tilting of said vertical axis.

12. A portable conveyor assembly, comprising an inclined conveyor having a lower end and an upper end, first wheel means to support the lower end of the conveyor, caster wheel means spaced from said first wheel means and disposed beneath said conveyor, said caster wheel means being mounted for free rotation about the vertical axis, a first toggle link pivotally connected to said conveyor, a second toggle link pivotally connected to said caster wheel means, adjacent ends of said toggle links being connected together at a junction, a tie-bar of fixed length interconnecting said caster wheel means and said conveyor, operating means for adjusting the angularity between said toggle links to thereby change the inclination of said conveyor, and means responsive to adjustable movement of said toggle links for automatically preventing tilting of said vertical axis, said caster wheel means comprising a horizontal axle, at least one caster wheel, support means for supporting the caster wheel for rotation about a horizontal axis, and means for mounting said support means relative to said axle about said vertical axis, said means responsive to adjustable movement of said toggle links comprising an inverted U-shaped bracket removably attached to said axle, a linkage operably interconnecting said bracket and said toggle links and clamping means for clamping said bracket to said axle.

13. The assembly of claim 12, wherein said axle is tubular and said clamping means includes a plunger disposed in aligned openings in said bracket and said axle and projecting into the interior of said axle, said plunger having a retracted position and a clamping position where the plunger is engaged with a portion of said axle opposite said aligned openings.

* * * * *